April 7, 1931. B. E. GETZ Re. 18,028

WASHING MACHINE

Original Filed April 14, 1923 2 Sheets-Sheet 1

INVENTOR.

Benjamin E. Getz

LaPorte LaPorte

ATTY'S

April 7, 1931. B. E. GETZ Re. 18,028

WASHING MACHINE

Original Filed April 14, 1923 2 Sheets-Sheet 2

INVENTOR.

Benjamin E. Getz

LaPorte & LaPorte

ATTY'S

Reissued Apr. 7, 1931 Re. 18,028

UNITED STATES PATENT OFFICE

BENJAMIN E. GETZ, OF MORTON, ILLINOIS, ASSIGNOR, BY DIRECT AND MESNE ASSIGNMENTS, OF ONE-HALF TO GETZ POWER WASHER CO., OF MORTON, ILLINOIS, A CORPORATION OF ILLINOIS, AND ONE-HALF TO WESTINGHOUSE ELECTRIC & MANUFACTURING COMPANY, OF EAST PITTSBURGH, PENNSYLVANIA, A CORPORATION OF PENNSYLVANIA

WASHING MACHINE

Original No. 1,669,514, dated May 15, 1928, Serial No. 631,966, filed April 14, 1923. Application for reissue filed June 27, 1929. Serial No. 374,253.

This invention has reference to washing machines and it has for its object to improve the mechanism for imparting movement to the agitating or washing element thereof.

In the present form of the invention the agitator or washing element is mounted for oscillation, and while the mechanism I have shown is adapted for imparting substantially a complete revolution to the agitator or washing element, before being reversed, it is to be understood, and those conversant with this art will understand, that the operating means may be arranged and constructed so as to give more or less than a substantial complete revolution to the said agitator or washing element.

The invention has for its principal object to provide a controllable means for the agitator or washing element operating means; such controllable means movable to different positions and adapted in one of its positions to impart movement to the agitator or washing element, and in another of its positions adapted to establish the agitator or washing element in a fixed and initial starting position and stopped, without stopping the movement of the agitator or washing element operating means.

The invention has for a further object to provide a controllable means for the agitator or washing element operating means, which said controllable means is adapted to give to the agitator or washing element a variable movement: such movement being under the full control of an attendant, manually operable and being dependent on the position to which the controllable means is adjusted. I have previously pointed out that in one position of the controllable means, movement may be imparted to the agitator or washing element; that in another position of the controllable means the agitator or washing element is established in a fixed and initial starting position and stopped; however, a variable movement can be imparted to the agitator or washing element, if the said controllable means is moved to or held at different points between such two described positions and provision is made for so moving or holding the said controllable means between such two described positions.

The invention has for a still further object the application of such a controllable means direct to the axis of the agitator or washing element and in the adjustment of the controllable means whereby different and variable movements may be imparted to the agitator or washing element, such adjusted positions of the controllable means are not only fixed but they are predetermined and thereby selective as concerns the attendant, who may obtain such movement of the agitator or washing element as may be desirable for the particular character, or kind, as well as the quantity of materials being washed.

The invention herein shown and described is an improvement on the generic idea disclosed in the application of Thomas Litwiller and John Leader, bearing Serial No. 442,336 (Letters Patent No. 1,460,203, dated June 26, 1923), and as to such generic disclosure a disclaimer is here made. There are two important and distinctive differences between what applicant discloses and what Litwiller et al. disclose, i. e., one is found in the application of the operating means, in which is included the controllable means, direct to the axis of the agitator or washing element, and the other is in the provision of the predetermined points which fix or determine the extent of oscillation which may be imparted to the agitator or washing element. Furthermore, this application is a companion to the application filed April 14, 1923, bearing Serial No. 631,965 (Letters Patent No. 1,665,922, dated April 10, 1928).

The present improvement resides in the controllable means which is included in an operating means and which is applicable to the axis of an agitator or washing element and adapted to impart oscillatory movement thereto, and in the inclusion of means, preferably having predetermined or fixed positions, for holding the controllable means in selective positions between two opposite or extreme movements of the said agitator or washing element, whereby variable movement may be imparted to the said agitator or washing element, at the will of the operator or attendant.

That the invention may be more fully understood, reference is had to the accompanying drawings, forming part of the description, and illustrating a preferred embodiment of the invention, in which:—

Figure 4:
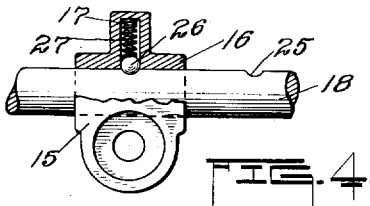
Figure 2:
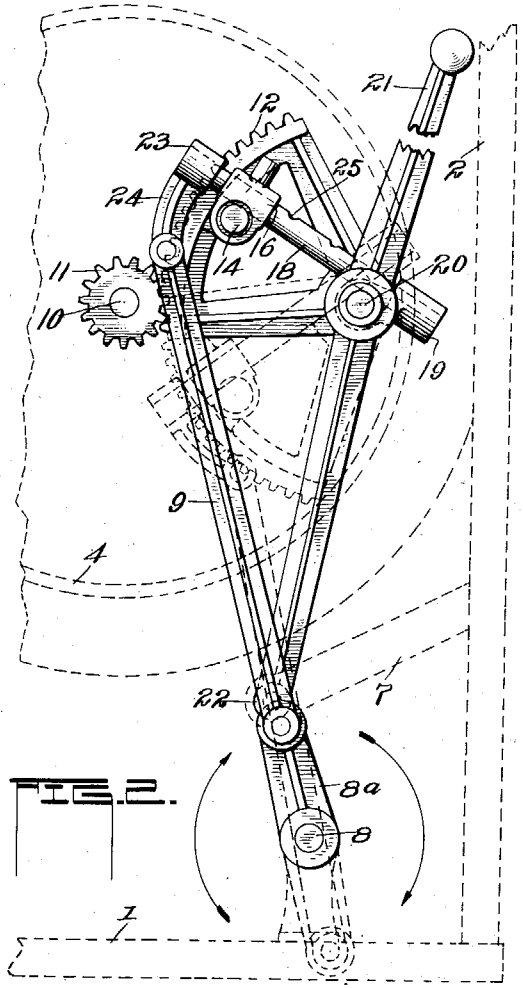
Fig. 2 is a view somewhat similar to Fig. 1, the relation of the controllable means and operating parts being the same, full and dotted lines indicating the movement of the parts to impart alternate rotary movement to the agitator or washing element.
Figure 3:
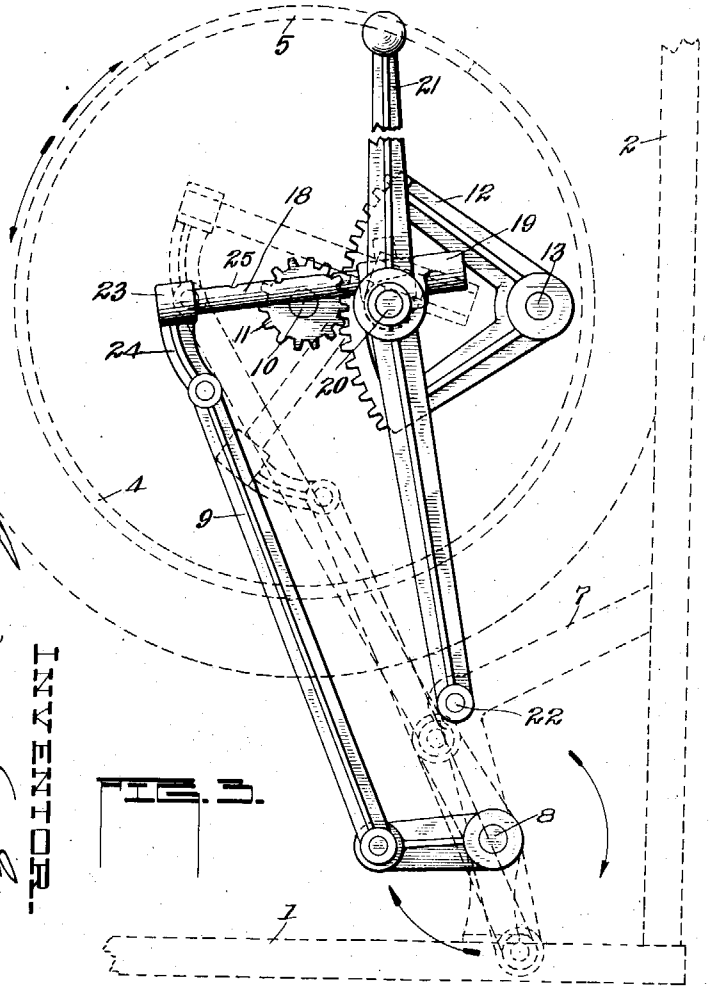

Fig. 3 is a view somewhat similar to Fig. 2, except that the controllable means has been moved from an operative to an inoperative position and the agitator or washing element established in a fixed and initial starting position and stopped, without stopping the operating means, and Fig. 4 is a detail showing a means which is employed to stop and hold the controllable means at different points between the extreme and predetermined points to which the controllable means may be moved, whereby variable movement of the agitator or washing element is obtained.

Like characters of reference denote corresponding parts throughout the figures.

Inasmuch as I am not concerned about the particular design or character of the machine, or the agitator or washing element mounted for movement therein, I have elected to show in dotted outline only, such parts.

Such a machine frame might include a suitable base 1, side members 2 and a top or cover 3. The agitator or washing element 4, I have elected to show in the form of an alternating rotary cylinder provided with a removable lid or section 5. As a mounting for the agitator or washing element in this form, frames 6 and 7 are provided. The showing of the cylinder type of machine is for illustrative purposes only and it is to be understood that the invention is applicable to various forms of such structures which embody agitator or washing elements of the oscillating type.

Figure 1:
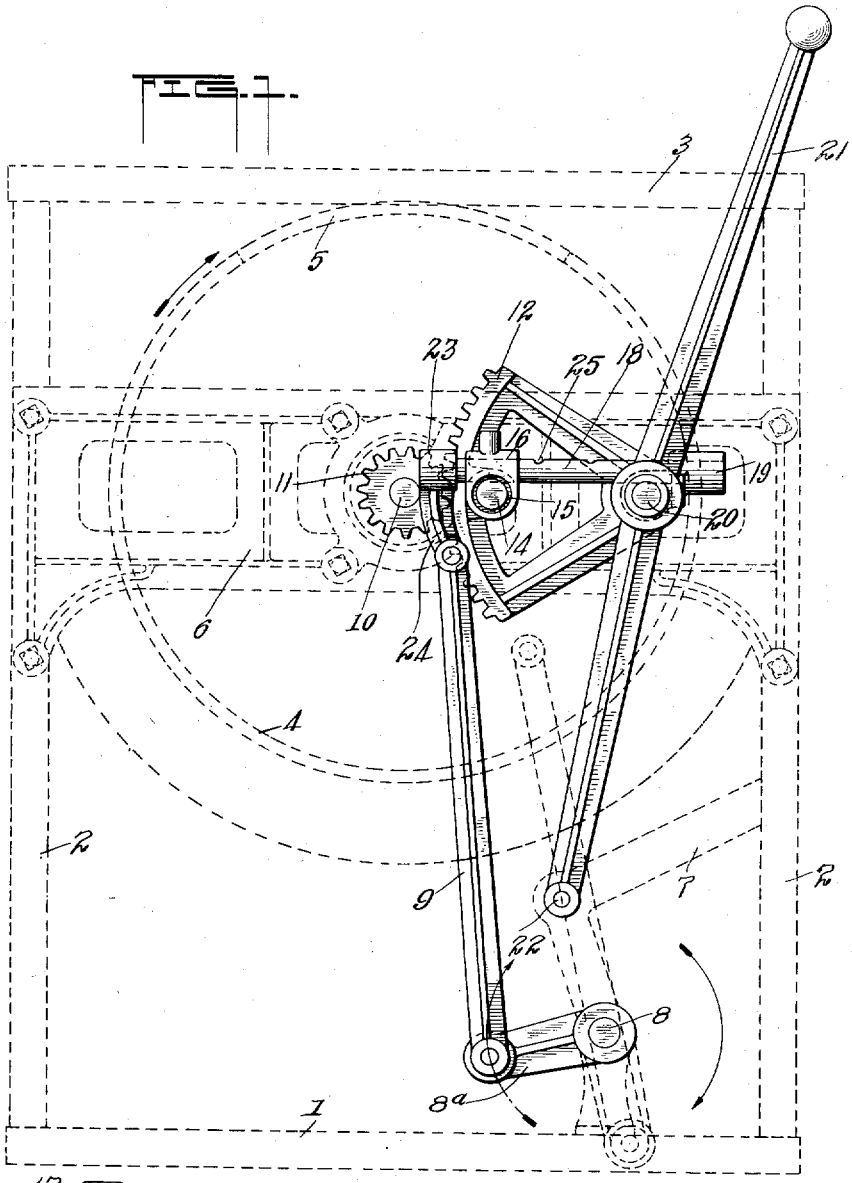
Fig. 1 is a side elevation of my controllable means for washing machines, and operating connections between the same and a power means, the frame supporting structure of the machine and agitator or washing element being shown in dotted lines, with the agitator or washing element in normal or neutral position, and dotted lines being used to illustrate movements of operating parts.

In Fig. 3, the agitator or washing element has been stopped in an inactive position, or as some would say, neutral position, and stopped, the operating means continuing in operation, and the controllable means idling and without imparting movement to or disturbing the agitator or washing element. In Figs. 1 and 2, the controllable means has been moved to a position which will cause the operating means to impart movement through the controllable means to the agitator or washing element, and as a result the agitator or washing element is alternately rotated, first in one direction, then in an opposite direction, somewhat as indicated by the full and dotted lines in Fig. 2.

By "normal" or "neutral" position of the agitator or washing element, it is to be understood that that is the position the agitator or washing element occupies when it is stopped (Fig. 3), whereby to permit the the removal or placement by an attendant, of clothes, fabrics or materials. Also, by the use of the word "restore" I mean the positioning or righting of the agitator or washing element to "normal," "neutral" and what might be termed an "inactive" and initial starting position at the same time that the operating means is made ineffective so far as actuating the agitator or washing element is concerned, yet without disturbing the movement of the operating means.

I am aware that the patent art discloses various mechanisms for stopping and locking and holding a tub in neutral position. One, in which it is necessary to return the agitating element to its neutral position, by hand, after it is stopped and then lock it. And others which require the manual operation and adjustment of a certain part or parts which are subsequently actuated to release a clutch or equivalent means to stop the movement of the agitating element when it reaches its neutral position. My controllable means when moved to one of its predetermined positions not only fixes the position of inactivity of the agitator or washing element, but stops it and holds it in such position, and the operating means can continue in operation. When the controllable means is moved to its other predetermined position, the agitator or washing element is simultaneously and automatically released, permitting it to be oscillated by the operating means, through such controllable means.

8 designates a driving shaft, which may form a part of or be included in any suitable transmission, not shown, through which power is imparted to said shaft from the usual motor, not shown. To one end of said shaft is connected a crank-arm 8ª, and connected to said crank-arm is a connecting bar or pitman 9 which is adapted to have an operative connection with the agitator or washing element through the controllable means to be described.

Connected with or adapted to be connected axially to the agitator or washing element 4, is a shaft 10 journaled in any suitable manner in the frame 6, and said shaft has connected thereto a grear wheel or pinion 11. Meshing with said gear wheel is a toothed segment 12 having a pivotal connection with a member 13 connected to or supported by the frame 6. To said segment is connected a pivot member 14 arranged in spaced relation to the axis of the member 13 and on said member 14 is carried a casting 15, forming a bearing member and being formed with a barrel or sleeve-like part 16 and a chambered portion 17. Slidably carried through said barrel or sleeve-like part of said member 15 is a rod or bar 18, its outer end connected with a casting 19 having connected thereto a pivot member 20 to which is connected a lever 21 fulcrumed at 22 to the frame 7. The inner end of the rod or bar 18 has connected thereto a casting 23 having a shank 24 which is pivotally connected with the upper end of the connecting bar or pitman 9.

The rod or bar 18 is provided with a plurality of spaced seats or depressions 25 with which coact the ball member 26 located in the casting 15 at the lower end of the chamber 17 in which is carried the spring 27 to normally hold the ball member in contact with the rod or bar 18. As the rod or bar 18 is moved back and forth through the casting 15, the ball member 26 will ride or roll on the surface of said rod or bar, and enter into each seat or depression 25 brought coincident therewith. The lock formed by the ball and seats or depressions to hold the rod or bar in different positions, whereby a variable movement may be imparted to the agitator or washing element, may be felt out by the attendant during the movement of said bar or rod, and very little effort or exertion on the part of the attendant will be required to release the rod or bar and to move it to its two extreme and predetermined positions, one operative and the other inoperative.

When the parts are in operative position, the member 20 is in axial coincidence with the axis of the pivot member 13 for the toothed segment, the rod or bar 18 having been moved outwardly bringing the casting 23 on the inner end thereof adjacent the casting 15 on the pivot member 14. In such position of the parts the rod of bar 18 may be oscillated up and down around the pivot member 20, as the connecting or pitman bar 9 is moved up and down, due to the rotation of the crank-arm 8[a], the thrust of said bar 9 being substantially in the direction of the pivot member 14 on the toothed segment and oscillating said segment, resulting in an alternate rotary movement being imparted to the gear wheel or pinion 11 and a like movement being imparted to the agitator or washing element, somewhat as illustrated in Fig. 2. When the parts are in inoperative position, that is, so far as the movement of the segment 12 and agitator or washing element is concerned, the pivot member 20 is in axial coincidence with the pivot member 14 on said segment and the casting 19 on the outer end of the rod or bar 18 has been moved to a position adjacent the casting 15. In this position of the parts as the connecting bar or pitman 9 is moved up and down, the rod or bar 18 will be oscillated but will idle on the pivot member 20, somewhat in the manner shown in Fig. 3, and without imparting movement to the segment 12 or the agitator or washing element. The movement of the lever 21 which will bring the member 20 into axial coincidence with the member 14 automatically fixes the initial or starting position of the agitator or washing element, see Fig. 3.

In addition to the advantage of establishing the agitator or washing element in a fixed and initial starting position and stopping its movement, my improvement has the further advantage of permitting the attendant to move the controlling means to different selective positions between its two extreme and predetermined positions, whereby greater or less movement of the agitator or washing element may be obtained. This is particularly desirable in the handling of coarse and fine fabrics and clothing. With such a controllable means as I have disclosed, the movement of the agitator or washing element may be gradually started and gradually stopped and there is no jerking or jiggling of the agitator or washing element as it is brought to a positive stop.

What I claim is:

1. In a machine of the character described, in combination, an agitating element mounted to be alternately oscillated, gearing arranged to impart alternate oscillation to said agitating element, a lever means for actuating said gearing having a plurality of predetermined fulcrum positions, said means including a controllable means for adjusting the fulcrum point of said actuating means to move the agitating element or establish it in a fixed and initial starting position, and means for holding said lever means at different points between two extreme positions.

2. In a machine of the character described, in combination, an agitating element mounted to be alternately oscillated, gearing arranged to impart alternate rotation to said agitating element, and operating means, operating connections between said gearing and said operating means, and a controllable means in said connections movable to a plurality of selective positions and adapted to be held in such positions, in certain of such positions the said gearing is effective for movement of the agitating element, and in one of such positions the gearing is ineffective for movement of the agitating element and the agitating element is established in a fixed and initial starting position, means to hold said controllable means in certain of its operating positions, and manually operable means for moving said controllable means.

3. In a machine of the character described, in combination, an agitating element mounted for movement, gearing arranged to impart movement to said agitating element, a sleeve-like member connected with said gearing, a rod having a slidable relation with said member, a lever having a connection with one end of the said rod for moving the latter alternately to operative and inoperative positions, and during such movement to the latter position bringing the agitating element to its normal position, and operating mechanism, and operating connections between said rod and said mechanism.

4. In a machine of the character described, in combination, an agitating element mounted for movement, gearing arranged to impart movement to said agitating element, including a segment gear member, a sleeve-like member connected with said segment gear and in spaced relation to its axis, a pivotally supported rod having a slidable relation in said sleeve-like member, and means for moving the axis of the pivot for said rod alternately into axial coincidence with the axis of said segment gear and the axis of said pivot member.

5. In a machine of the character described, in combination, an agitating element mounted for movement, gearing arranged to impart movement to the agitating element, including a segment gear, a member connected with said segment gear in spaced relation to its axis, a rod slidably carried through said member and provided with a plurality of spaced indentations, a lever, a member on one end of the rod in pivotal connection with said lever, the axis of which is adapted to be moved alternately into axial coincidence with the axis of the segment gear and the member connected thereto, means to oscillate said rod, and means to engage in the indentations in said rod to hold the rod in different positions.

6. In a machine of the character described, in combination, an agitating element mounted for movement, gearing arranged to impart movement to the agitating element, including a segment gear, a driving shaft, operating connections between said shaft and said segment gear, including a member connected to said segment gear in spaced relation to its axis, a rod having a slidable relation with said member, means connecting the rod and shaft, a lever, and means pivotally connecting said rod with said lever, said pivotal connection of the rod and lever adapted to be moved into axial coincidence with the axis of the segment member to operate the gearing and agitating element and adapted to be moved into axial coincidence with the member connected to the segment gear to simultaneously establish the agitating element in a fixed and initial starting position and stop the movement of gearing and agitating element.

7. In a machine of the character described, in combination, an axially driven agitating element and gearing geared to the axis of said element for imparting alternate oscillatory movement thereto, including an adjustable means adapted when adjusted to one position to establish the agitating element in an initial starting position and stop its movement.

8. In a machine of the character described, in combination, an axially driven agitating element and gearing geared to the axis of said element for imparting alternate oscillatory movement thereto, including an adjustable means adapted when adjusted to one position to simultaneously establish the agitating element in an initial starting position and stop its movement.

9. In a machine of the character described, in combination, an axially driven agitating element and gearing geared to the axis of said element for imparting alternate oscillatory movement thereto, means to actuate said gearing including an adjustable means adapted when adjusted to one position to establish the agitating element in an initial starting position and stop its movement without stopping said actuating means.

10. In a machine of the character described, in combination, an axially driven agitating element and gearing geared to the axis of said element for imparting alternate oscillatory movement thereto, means to actuate said gearing including an adjustable means adapted when adjusted to one position to simultaneously establish the agitating element in an initial starting position and stop its movement without stopping said actuating means.

11. In a machine of the character described, in combination, an axially driven agitating element and gearing geared to the axis of said element for imparting alternate oscillatory movement thereto, means to actuate said gearing including manually adjustable means adapted when adjusted to one position to establish the agitating element in an initial starting position and stop its movement without stopping said actuating means.

12. In a machine of the character described, in combination, an agitating element mounted for movement, an operating means, gearing between said operating means and said element, including a controllable means movable to predetermined positions and in selective positions therebetween to impart a variable movement to said agitating element, and in one of such predetermined positions to stop the movement of the agitating element in an initial starting position.

13. In a machine of the character described, in combination, an agitating element mounted for movement, an operating means, gearing between said operating means and said element, including a controllable means which is manually movable to predetermined positions and in selective positions therebetween to impart a variable movement to said agitating element, and in one of such predetermined positions to stop the movement of the agitating element in an initial starting position.

14. In a machine of the character described, in combination, a shaft, an agitating element arranged to be operated by said shaft, an operating means, gearing between said operating means and said shaft, including a controllable means movable to predetermined positions and in selective positions therebetween to impart a variable movement to said agitating element, and in one of such predetermined positions to stop the movement of the agitating element in an initial starting position.

15. In a machine of the character described, in combination, an agitator shaft, an agitating element connected for movement by said shaft, gearing operatively connected with said shaft to impart oscillatory movement thereto, means to actuate said gearing including an adjustable means for varying the amplitude of oscillations of said shaft and said agitating element adapted when adjusted to one position to establish said agitating element in an initial starting position and stop its movement, without stopping the movement of said actuating means.

16. In a machine of the character described, in combination, an agitator shaft, an agitating element connected for movement by said shaft, gearing operatively connected with said shaft to impart oscillatory movement thereto, means to actuate said gearing including an adjustable means for varying the amplitude of oscillations of said shaft and said agitating element adapted when adjusted to one position to establish said agitating element in an initial starting position and stop its movement, independently of the amplitude of oscillations of said agitating element.

17. In a machine of the character described, in combination, an agitator shaft, an agitating element connected for movement by said shaft, gearing operatively connected with said shaft to impart oscillatory movement thereto, means to actuate said gearing including an adjustable means for varying the amplitude of oscillations of said shaft and said agitating element adapted when adjusted to one position to establish said agitating element in an initial starting position and stop its movement, independently of the amplitude of oscillations of said agitating element and without stopping the movement of said actuating means.

18. In a machine of the character described, in combination, an agitator shaft, an agitating element connected to be oscillated by said shaft, gearing connected with said shaft, means to operate said gearing including a controllable means movable to different positions whereby to selectively vary the amplitude of oscillations of said agitating element, and means to adjust said controllable means.

19. In a machine of the character described, in combination, an agitator shaft, an agitating element connected to be oscillated by said shaft, gearing connected with said shaft, means to operate said gearing including a controllable means movable to different positions whereby to selectively vary the amplitude of oscillations of said agitating element, and means to manually adjust said controllable means.

20. In a machine of the character described, in combination, an agitator shaft, an agitating element connected to be oscillated by said shaft, a gear pinion on one end of said shaft, a segment gear meshing with said pinion, means to oscillate said segment gear including an adjustable means movable to different positions whereby to selectively vary the amplitude of oscillations of the washing element, and a means whereby to position said adjusting means.

21. In a machine of the character described, in combination, an agitator shaft, an agitating element connected to be oscillated by said shaft, a gear pinion on one end of said shaft, a segment gear meshing with said pinion, a drive shaft, operating connections between said drive shaft and said segment gear including a pitman bar and also an adjustable means movable to different positions whereby to selectively vary the amplitude of oscillation of said agitating element, and means to adjust said adjustable means.

22. Means for oscillating the clothes moving element of a washing machine including a driving element operating at uniform speed and a variable stroke device interposed between the driving element and said moving element of a washing machine and arranged for adjustment during the operation of the driving element to vary the amplitude of oscillation of the moving element of the washing machine, said variable stroke device having provisions to mechanically fix the parts in the various positions of adjustment.

23. Means for operating the clothes moving element of a washing machine including means for actuating said element and means operable during the operation of said actuating means for varying the length of stroke of the element, said varying means having provisions to mechanically fix the parts in the various positions of adjustment.

24. Means for operating the clothes moving element of a washing machine, including means for imparting to said element a given number of oscillations per unit of time, and means operable during the operation of said first named means for varying the length of stroke of the element, said varying means having provisions to mechanically fix the parts in the various positions of adjustment.

25. Means for operating the clothes moving element of a washing machine including means for actuating said element and means operable during the operation of said actuating means for varying the length of stroke of the element from zero to the maximum and vice versa, said varying means having provisions to mechanically fix the parts in the various positions of adjustment.

26. Means for operating the clothes moving element of a washing machine, including means for oscillating said element and settable controlled means operable during the continuous operation of the first named means for varying the length of stroke of the element, whereby the degree of agitation of the water may be changed to suit the requirements of the articles to be washed, said settable controlled means having provisions to mechanically fix the parts in the various positions of adjustment.

27. Means for operating the clothes moving element of a washing machine including means for oscillating said element, and means operable during the operation of said first named means for varying the action of the oscillating means to provide oscillatory strokes of any one of a plurality of different lengths, whereby the degree of agitation of the water may be changed to suit the requirements of the articles to be washed, said varying means having provisions to mechanically fix the parts in the various positions of adjustment.

28. The combination with a washing machine element, of means for actuating the same in a variable manner to accord with different articles to be washed, comprising driving means, connecting parts between the driving means and the washing machine element, and adjustable instrumentalities operatively associated therewith adapted to be fixedly adjusted at different points throughout a substantial range between starting and concluding points of adjustment and while the driving means is in operation, to vary the actuation of the washing machine element.

29. The combination with a washing machine element, of means for actuating the same in a variable manner to accord with different articles to be washed, comprising driving means, connecting parts between the driving means and the washing machine element, and adjustable instrumentalities operatively associated therewith adapted to be fixedly adjusted at an intermediate point between starting and concluding points of adjustment and while the driving means is in operation, to vary the actuation of the washing machine element.

30. A washing machine having an agitator therein, means for actuating said agitator, and means operable during the operation of said actuating means and including gearing axially associated with the agitator for varying the length of stroke of the agitator from zero to the maximum and vice versa.

31. A washing machine having an agitator therein, means for actuating said agitator, and means operable during the operation of said actuating means and including gearing axially associated with the agitator for varying the length of stroke of the agitator from zero to the maximum and vice versa in combination with means for mechanically fastening the parts in any of a variety of positions between zero and maximum or vice versa.

32. A washing machine having an agitator therein, means for actuating said agitator, and means operable during the operation of said actuating means for varying and mechanically fixing the length of stroke of the agitator.

In witness whereof, I have hereunto affixed my hand this 27th day of May, 1929.

BENJAMIN E. GETZ.